US012683285B2

(12) United States Patent
Sagawa et al.

(10) Patent No.: US 12,683,285 B2
(45) Date of Patent: Jul. 14, 2026

(54) LEAKY CABLE AND METHOD OF MANUFACTURING LEAKY CABLE

(71) Applicant: Proterial, Ltd., Tokyo (JP)

(72) Inventors: Hideyuki Sagawa, Tokyo (JP); Takahiro Sugiyama, Tokyo (JP); Izumi Fukasaku, Tokyo (JP); Yasunori Takaki, Tokyo (JP); Nobuaki Kitano, Tokyo (JP); Shuichi Numata, Tokyo (JP)

(73) Assignee: Proterial, Ltd., Tokyo (JP)

( * ) Notice: Subject to any disclaimer, the term of this patent is extended or adjusted under 35 U.S.C. 154(b) by 84 days.

(21) Appl. No.: 18/238,227

(22) Filed: Aug. 25, 2023

(65) Prior Publication Data

US 2024/0097343 A1 Mar. 21, 2024

(30) Foreign Application Priority Data

Sep. 20, 2022 (JP) ................................ 2022-149547

(51) Int. Cl.
*H01Q 13/20* (2006.01)
*H01P 3/06* (2006.01)
(Continued)

(52) U.S. Cl.
CPC ............. *H01Q 13/203* (2013.01); *H01P 3/06* (2013.01); *H01P 3/127* (2013.01); *H01P 11/002* (2013.01)

(58) Field of Classification Search
CPC ........ H01P 3/06; H01P 11/002; H01P 11/005; H01P 3/127; H01Q 13/20; H01Q 13/203; H01Q 13/22
See application file for complete search history.

(56) References Cited

U.S. PATENT DOCUMENTS

| | | | | |
|---|---|---|---|---|
| 9,065,183 B2 * | 6/2015 | Suzuki | ................. | H01Q 13/203 |
| 10,770,772 B2 * | 9/2020 | Suenaga | ............. | H01B 13/003 |

(Continued)

FOREIGN PATENT DOCUMENTS

| | | |
|---|---|---|
| JP | S48-014834 B | 11/1969 |
| JP | H10-022724 A | 1/1998 |

(Continued)

OTHER PUBLICATIONS

WO-2018040637-A1 Translation (Year: 2018).*
Japanese Office Action dated Sep. 30, 2025 in Japanese Patent Application No. 2022-149547 with English translation thereof.

*Primary Examiner* — Dameon E Levi
*Assistant Examiner* — Gurbir Singh
(74) *Attorney, Agent, or Firm* — McGinn IP Law Group, PLLC

(57) ABSTRACT

A leaky cable is provided with a linear insulator and a metal layer formed on an outer peripheral surface of the insulator. A slot for leaking electromagnetic waves is formed through the metal layer between an inner peripheral surface and an outer peripheral surface of the metal layer, and the outer peripheral surface of the insulator is formed with unevenness that inhibits misalignment of the slot with respect to the insulator. The method of manufacturing the leaky cable includes forming an insulator composed of thermoplastic resin in a cylindrical shape, roughening an outer peripheral surface of the insulator, forming a metal layer on the outer peripheral surface of the insulator, and forming a slot through the metal layer between an inner peripheral surface and an outer peripheral surface of the metal layer. The slot is configured to leak electromagnetic waves to outside of the metal layer.

13 Claims, 6 Drawing Sheets

(51) Int. Cl.
*H01P 3/127* (2006.01)
*H01P 11/00* (2006.01)

(56) References Cited

U.S. PATENT DOCUMENTS

| | | | |
|---|---|---|---|
| 2011/0234338 | A1 | 9/2011 | Takahashi |
| 2020/0234847 | A1 | 7/2020 | Suenaga et al. |

FOREIGN PATENT DOCUMENTS

| | | | | |
|---|---|---|---|---|
| JP | 2000-099887 | A | 4/2000 | |
| JP | 2003-168330 | A | 6/2003 | |
| JP | 2011-199760 | A | 10/2011 | |
| JP | 2013-176872 | A | 9/2013 | |
| JP | 2020-117754 | A | 8/2020 | |
| WO | 2011-099457 | A1 | 8/2011 | |
| WO | WO-2018040637 | A1 * | 3/2018 | ............... H01B 7/17 |

* cited by examiner

LEAKY CABLE AND METHOD OF MANUFACTURING LEAKY CABLE

CROSS-REFERENCE TO RELATED APPLICATIONS

The present application is based on Japanese patent application No. 2022-149547 filed on Sep. 20, 2022, the entire contents of which are incorporated herein by reference.

TECHNICAL FIELD

The present invention relates to a leaky cable with slots formed to leak electromagnetic waves, and a method for manufacturing the same.

BACKGROUND OF THE INVENTION

Conventionally, leaky cables that transmit electromagnetic waves for communication and have slots (leakage holes) formed in multiple locations in the longitudinal direction to leak electromagnetic waves are laid, e.g., in tunnels and in large rooms. Such leaky cables are known as leaky waveguides made of electrically conductive metals such as copper and aluminum in the form of hollow corrugated tubes, and leaky coaxial cables in which a center conductor is placed in the center of a linear (i.e., wire-shaped) insulator and a cylindrical (i.e., tubular) conductive metal member is placed as an outer conductor on an outer periphery of the insulator. Such leaky cables are laid with their directivity adjusted so that slots formed in the conductive metal open in the direction in which electromagnetic waves are desired to be directed (see, e.g., Patent Literatures 1 to 3).

CITATION

List Patent Literature 1: JP2000-99887A
Patent Literature 2: JP2003-168330A
Patent Literature 3: JP2011-199760A

SUMMARY OF THE INVENTION

In the above leaky cables, it is desirable to make the electrically conductive metal in which the slots are formed thinner for improved flexibility, lower cost, and weight reduction. For this reason, the present inventors conceived a leaky waveguide and a leaky coaxial cable in which a thin metal layer is formed on an outer periphery of a linear insulator and slots are formed in this metal layer. However, in the leaky waveguide and the leaky coaxial cable with such a configuration, there was a problem in that the metal layer would slip on the outer periphery surface of the insulator during installation, thereby often causing the slot positions to shift.

It is, therefore, an object of the present invention to provide a leaky cable with a slot formed in a metal layer formed on an outer periphery of a linear insulator to leak electromagnetic waves, which is capable of suppressing the occurrence of misalignment of the slots with respect to the insulator, and a manufacturing method thereof.

To achieve the object described above, one aspect of the invention provides a leaky cable, comprising:

a linear insulator; and a metal layer formed on an outer peripheral surface of the insulator, wherein a slot for leaking electromagnetic waves is formed through the metal layer between an inner peripheral surface and an outer peripheral surface of the metal layer, wherein the outer peripheral surface of the insulator is formed with unevenness that inhibits misalignment of the slot with respect to the insulator.

To achieve the object described above, another aspect of the invention provides a method of manufacturing a leaky cable, comprising:

an insulator forming step of forming an insulator comprising thermoplastic resin in a cylindrical shape;

a roughening step of roughening an outer peripheral surface of the insulator;

a metal layer forming step of forming a metal layer on the outer peripheral surface of the insulator; and a slot forming step of forming a slot through the metal layer between an inner peripheral surface and an outer peripheral surface of the metal layer, the slot being configured to leak electromagnetic waves to outside of the metal layer.

Advantageous Effects of the Invention

According to the leaky cable and its manufacturing method of the present invention, it is possible to suppress the occurrence of misalignment of the slots with respect to the insulator, making it easier to direct electromagnetic waves in the desired direction.

DETAILED DESCRIPTION OF THE INVENTION

Embodiments

Next, the embodiments of the present invention will be described with reference to appended drawings. In the first embodiment, a leaky cable of the present invention is described as a leaky waveguide. In the second embodiment, the leaky cable of the present invention is described as a leaky coaxial cable.

First Embodiment

Figure 1A:
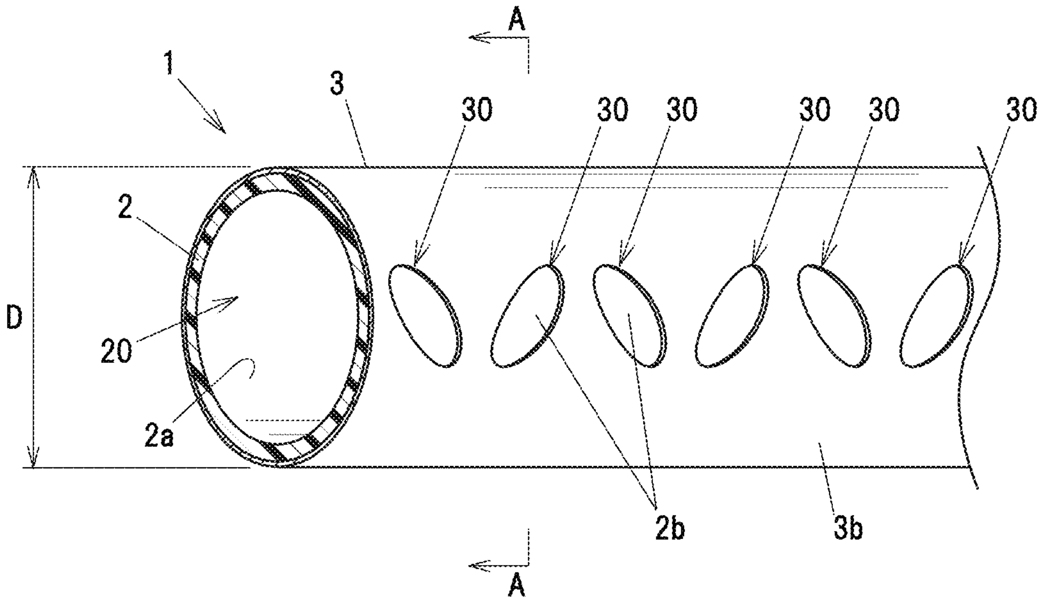
FIG. 1A is a perspective cross-sectional view of a leaky waveguide according to the first embodiment of the present invention.
Figure 1B:
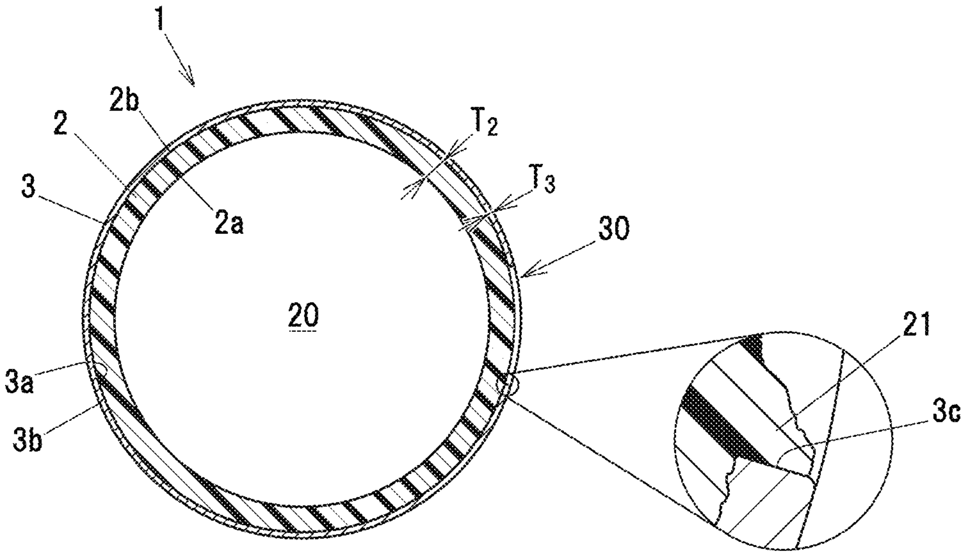
FIG. 1B is a cross-sectional view of the leaky waveguide taken along a line A-A in FIG. 1A.

FIG. 1A is a perspective cross-sectional view of a leaky waveguide 1 according to the first embodiment of the present invention. FIG. 1B is a cross-sectional view of the leaky waveguide 1 taken along a line A-A in FIG. 1A.

The leaky waveguide 1 transmits electromagnetic waves in the microwave band with wavelengths, e.g., from 300 MHz to 3 THz, and also leaks electromagnetic waves to the outside of the leaky waveguide 1.

The leaky waveguide 1 includes a linear insulator 2, and a metal layer 3 formed on the outer periphery of the insulator 2. The insulator 2 is composed of a thermoplastic resin having flexibility and electrical insulation properties. The resin material of insulator 2 desirably has a low dielectric constant to suppress dielectric loss. In this embodiment, the insulator 2 is made of polyethylene. However, the resin material of insulator 2 is not limited to polyethylene, and, e.g., polypropylene or fluorinated resin may also be used.

The insulator 2 is formed in a hollow cylindrical (tubular) shape, and a cavity 20 is formed in the center of the insulator 2 over the entire leaky waveguide 1. In this embodiment, the insulator 2 is cylindrical, and an inner peripheral surface 2*a* and an outer peripheral surface 2*b* of the insulator 2 in a cross-section perpendicular to the longitudinal direction of the leaky waveguide 1 are circular in shape, respectively.

Slots 30 for leaking electromagnetic waves are formed in the metal layer 3 in a plurality of locations along the longitudinal direction of the leaky waveguide 1. Each slot 30 is formed to penetrate through an inner peripheral surface 3*a* and an outer peripheral surface 3*b* of the metal layer 3. Electromagnetic waves are emitted (leaked) from the portions where the slots 30 are formed toward the outside of the metal layer 3 with a predetermined directivity.

The metal layer 3 is made of, e.g., copper, silver, aluminum, or iron, and is formed on the outer peripheral surface 2*b* of the insulator 2 by the electroless plating method. The electroless plating method is a method in which metal is deposited by a chemical reaction using a solution containing dissolved metal ions to be deposited as plating, without electrolysis. When electroless plating is performed, palladium, which serves as a deposition nucleus, is adsorbed on the outer peripheral surface 2*b* of the insulator 2.

The required thickness of the metal layer 3 depends on the frequency of the electromagnetic waves propagating through the leaky waveguide 1. For example, if the frequency is 28 GHz, it is about 0.4 μm, and if the frequency is several hundred MHz, it is about 5 μm. If the electromagnetic waves propagating through the leaky waveguide 1 include a low frequency band of, e.g., 50 MHz, the thickness of the metal layer 3 may be m or more.

As shown in FIG. 1B, when the radial thickness of the insulator 2 is $T_2$ and the thickness of the metal layer 3 is $T_3$, the ratio of $T_3$ to $T_2$ ($T_3/T_2$) is, e.g., between 0.2% and 40%. By setting the ratio of $T_3$ to $T_2$ in this way, peeling (i.e., delaminating) of the metal layer 3 can be suppressed even when the leaky waveguide 1 is bent, and the leaky waveguide 1 can be laid in a bent state.

The outer diameter D of the leaky waveguide 1 is, e.g., 0.16 mm or more and 42 mm or less. A desirable range of the outer diameter D suitable for the manufacturing method described below is 1 mm or more and 8 mm or less. The leaky waveguide 1 can be bent to 90° without cracking or delaminating the metal layer 3 at a bending radius of 2.5 times the outer diameter D.

The outer peripheral surface 2*b* of the insulator 2 is formed with irregularities (i.e., unevenness) that inhibit misalignment of the slots 30 with respect to the insulator 2. The surface roughness of the outer peripheral surface 2*b* of the insulator 2 is larger than that of the inner peripheral surface 2*a* of the insulator 2. The outer peripheral surface 2*b* of the insulator 2 is roughened by the roughening process described below, and this roughening enhances the adhesion strength with the metal layer 3.

The area roughness (arithmetical mean height value Sa specified in ISO 25178) of the outer peripheral surface 2*b* of the insulator 2 in the area covered by the metal layer 3 is 0.8 μm or more and 6.0 μm or less. If the area roughness of the outer peripheral surface 2*b* of the insulator 2 is lower than 0.8 μm, the adhesion strength with the metal layer 3 is not sufficient, and if the area roughness of the outer peripheral surface 2*b* of the insulator 2 is higher than 6.0 μm, electromagnetic waves are diffusely reflected by the inner peripheral surface 3*a* of the metal layer 3.

The slot 30 is formed by forming the metal layer 3 on the outer periphery of the insulator 2 and then irradiating a laser beam from the outer peripheral surface 3*b* of the metal layer 3 toward the insulator 2. During this laser beam irradiation, a portion of the insulator 2 heated by the heat of the laser beam melts to form a liquid molten resin, which is subsequently solidified. A portion of the insulator 2 thus solidified protrudes from the inner peripheral surface 3*a* toward the outer peripheral surface 3*b* of the metal layer 3 at the peripheral edge of the slot 30. FIG. 1B shows the protrusion 21 thus formed. The protrusion 21 adheres to at least a portion of an end surface 3*c* of the metal layer 3 at the peripheral edge of the slot 30.

This protrusion 21, together with the roughening of the outer peripheral surface 2*b* of the insulator 2 in the portion covered by the metal layer 3, suppresses the misalignment of the slots 30 with respect to the insulator 2. More specifically, the roughened outer peripheral surface 2*b* of the insulator 2 in the portion covered by the metal layer 3 enhances the adhesion strength between the outer peripheral surface 2*b* of the insulator 2 and the inner peripheral surface 3*a* of the metal layer 3 by the anchor effect when the metal layer 3 is formed by the electroless plating method, and the protrusion 21 engages the slot 30. The misalignment of the slot 30 with respect to the insulator 2 is therefore mechanically restrained.

In other words, in this embodiment, the irregularity (unevenness) that suppresses the misalignment of the slot 30 with respect to the insulator 2 is formed by the roughening of the outer peripheral surface 2*b* of the insulator 2 in the portion covered by the metal layer 3, and by the solidification of the molten resin melted by the heat of the laser beam when the slot 30 is formed in the metal layer 3, a part of the insulator 2, thereby forming the protrusion 21 which protrudes from the inner peripheral surface 3*a* toward the outer peripheral surface 3*b* of the metal layer 3 at the peripheral edge of the slot 30.

Next, the manufacturing method of the leaky waveguide 1 is described with reference to FIGS. 2A to 2D. The manufacturing method of the leaky waveguide 1 includes an insulator forming step of forming an insulator 2 in a cylindrical shape around an outer periphery of a shaft-shaped core material 4, a roughening step of roughening an outer peripheral surface 2*b* of the insulator 2, a metal layer forming step of forming a metal layer 3 on the roughened outer peripheral surface 2*b* of the insulator 2, a slot forming step of forming a plurality of slots 30 that penetrate through an inner peripheral surface 3*a* and an outer peripheral surface 3*b* of the metal layer 3, and a cavity forming step of removing the core material 4 to form a cavity 20 in the center of the insulator 2, after the metal layer forming step or the slot forming step.

Figure 2A:
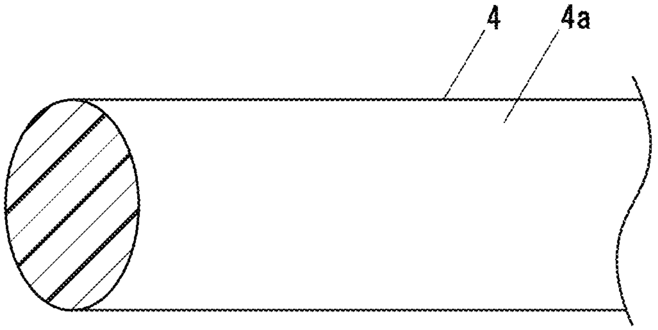
FIGS. 2A to 2D are perspective views showing the manufacturing process of the leaky waveguide.

FIG. 2A is a perspective view of the core material 4. The core material 4 is made of resin. In order to facilitate the removal of the core material 4 in the cavity forming step, it is desirable for the resin material of the core material 4 to have a low coefficient of friction. In this embodiment, the core material 4 is made of, e.g., fluororesin, such as PTFE (polytetrafluoroethylene), PFA (perfluoroalkoxyalkane), FEP (tetrafluoroethylene hexafluoropropylene copolymer). The cross-section of the core material 4 is circular and its outer peripheral surface 4*a* is a smooth surface with no unevenness.

Figure 2B:
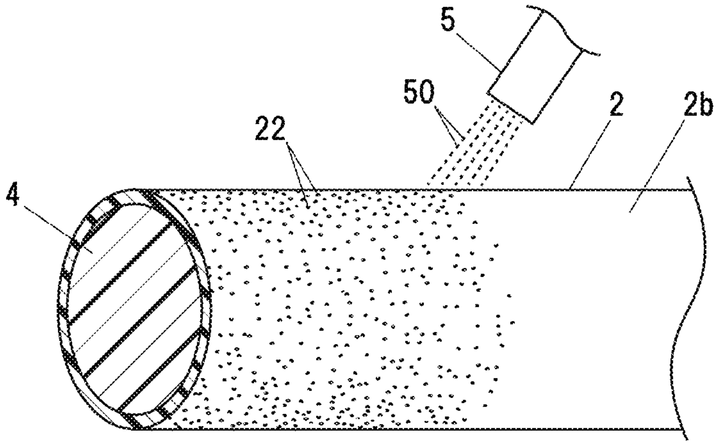

FIG. 2B is a perspective view showing the roughening of the outer peripheral surface 2*b* of the insulator 2 formed in the insulator forming step. In the insulator forming step, the resin material that will become the insulator 2 is heated and melted to form the insulator 2 by extrusion molding, which extrudes the resin material into a tubular shape around the outer periphery of the core material 4. In this step, the melting point temperature of the core material 4 is preferably higher than that of the resin material of the insulator 2 to prevent the core material 4 and the insulator 2 from melting together and becoming one piece.

In this embodiment, as shown in FIG. 2B, the roughening step is performed by dry ice blasting, in which fine-grained dry ice 50 is injected from an injection nozzle 5 together with the injected gas. The area hit by the dry ice 50 becomes a fine recess 22. This dry ice blasting creates fine irregularities on the outer peripheral surface 2*b* of the insulator 2.

Figure 2C:
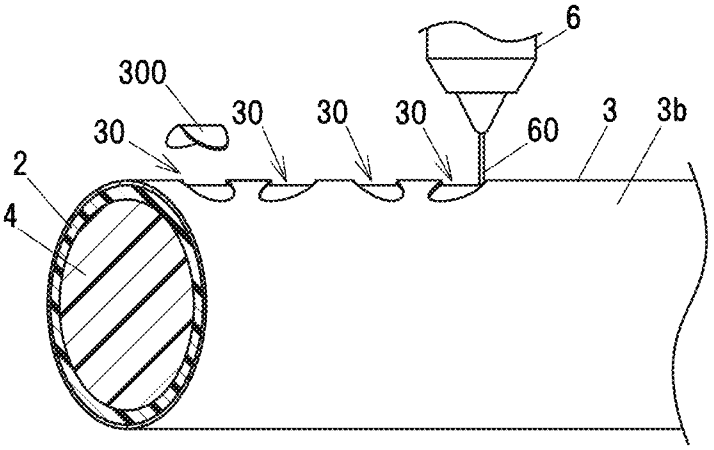

FIG. 2C is a perspective view showing the formation of the slots 30 by laser processing in the metal layer 3 formed by the metal layer forming step. In the metal layer forming step, the metal layer 3 is formed by the electroless plating method, as described above. By forming the metal layer 3 by the electroless plating method, the metal layer 3 is formed to bite into the fine recess 22 formed on the outer peripheral surface 2*b* of the insulator 2.

In the slot forming step, a laser beam 60 is applied to the outer peripheral surface 3*b* of the metal layer 3 to open the slot 30, and a portion of the insulator 2 is melted by the heat of the laser beam 60. Specifically, the laser beam 60 is irradiated from a laser processing head 6 so as to surround the portion that will become the slot 30, cut the metal layer 3, and remove a metal strip (i.e., metal piece) 300 that is inside the cut portion to form the slot 30. Depending on the size of the slot 30, the slot 30 may be formed in the metal layer 3 by irradiating a laser beam with a shape corresponding to the shape of the slot 30.

The heat of the laser beam 60 also acts on the insulator 2 to melt a part of the insulator 2, and the molten resin flows and solidifies to form the protrusion 21. In other words, a portion of the resolidified resin portion, in which the molten resin melted by the heat of the laser beam 60 solidifies, protrudes from the inner peripheral surface 3*a* toward the outer peripheral surface 3*b* of the metal layer 3 at the peripheral edge of the slot 30, thereby forming the protrusion 21.

Figure 2D:
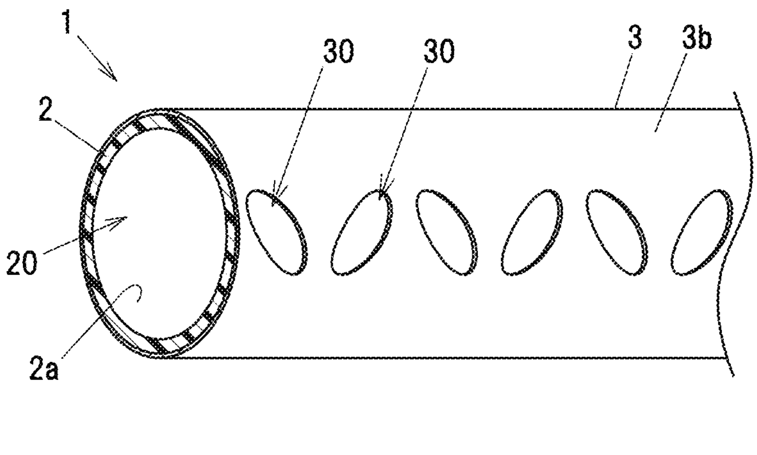

FIG. 2D is a perspective view showing the leaky waveguide 1 with the cavity 20 formed in the center of the insulator 2 after the core material 4 is removed in the cavity forming step. In the cavity forming step, the core material 4 is removed by pulling the core material 4 from the insulator 2. The coefficient of kinetic friction between the insulator 2 and the metal layer 3 during the cavity forming step is greater than that between the insulator 2 and the core material 4. This allows the core material 4 to be pulled out while suppressing the peeling (i.e., delaminating) of the metal layer 3 in the cavity forming step. In this embodiment, the kinetic coefficient of friction between the insulator 2 and the core material 4 is kept low by forming the core material 4 with fluoro resin, and the kinetic coefficient of friction between the insulator 2 and the metal layer 3 is increased by roughening the outer peripheral surface 2*b* of the insulator 2.

Although FIGS. 2C and 2D illustrate a case in which the cavity forming step is performed after the slot forming step, the cavity forming step may be performed after the metal layer forming step but before the slot forming step. However, it is more desirable to perform the cavity forming step after the slot forming step so that the position of the slot 30 relative to the insulator 2 does not shift when the core material 4 is pulled out.

Figure 3:
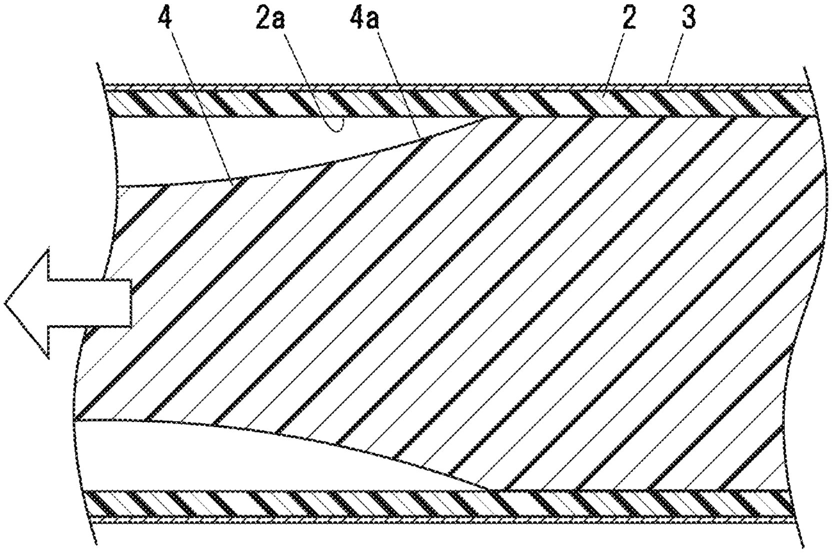
FIG. 3 is a cross-sectional view of a core material being pulled out of an insulator.

FIG. 3 is a cross-sectional view of the core material 4 being pulled out from the insulator 2 in the arrow direction during the cavity forming step. Before the cavity forming step, the outer peripheral surface 4*a* of the core material 4 and the inner peripheral surface 2*a* of the insulator 2 are in close contact, but when the core material 4 is pulled out, it is peeled off from the inner peripheral surface 2*a* of the insulator 2. The core material 4 in the portion peeled off from the inner peripheral surface 2*a* of the insulator 2 is stretched in the axial direction to become thinner, and friction with the inner peripheral surface 2*a* of the insulator 2 is suppressed. In other words, in this step, the core material 4 is pulled out while being stretched in the axial direction during the cavity forming step.

Figure 4A:
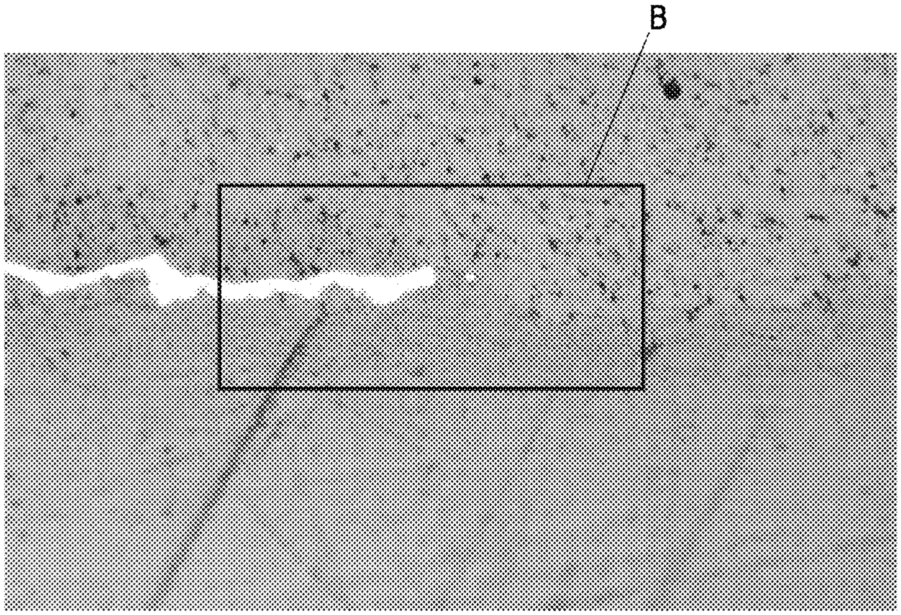
FIG. 4A is a cross-sectional photographic image of the leaky waveguide showing the peripheral edge of the slot.
Figure 4B:
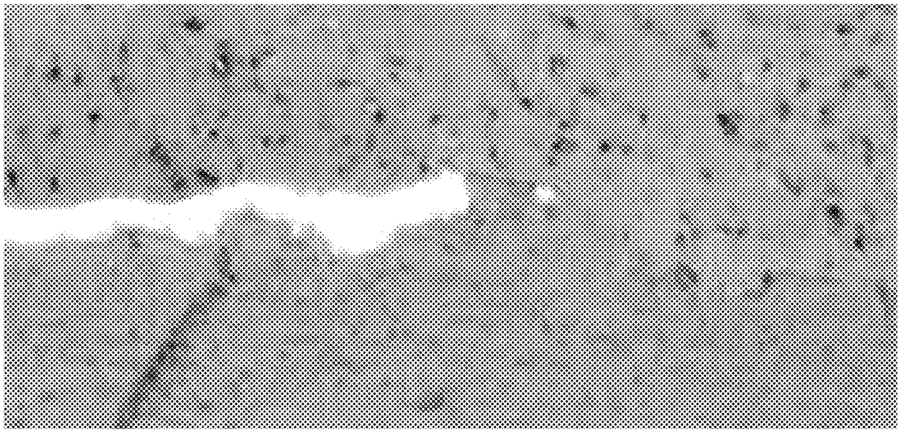
FIG. 4B is a magnified photographic image of part B in FIG. 4A.
Figure 4C:
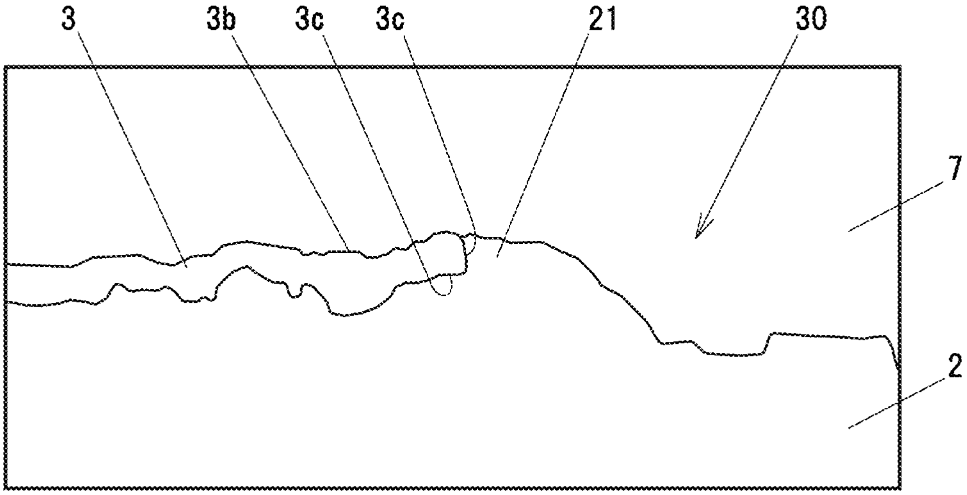
FIG. 4C is a schematic diagram showing the boundaries between the parts in FIG. 4B.

FIG. 4A is a cross-sectional photographic image of the leaky waveguide 1 showing the peripheral edge of the slot 30. FIG. 4B is a magnified photographic image of part B of FIG. 4A. FIG. 4C is a schematic diagram showing the boundaries between the parts in FIG. 4B. The cross-sectional photographic image in FIG. 4A shows a coating layer 7 made of resin on the further outer periphery of the metal layer 3, and the insulator 2 and metal layer 3 are cut together with the coating layer 7.

As shown in FIG. 4C, the protrusion 21 protrudes from the inner peripheral surface 3*a* toward the outer peripheral surface 3*b* of the metal layer 3 at the peripheral edge of the slot 30 and adheres to the end surface 3*c* of the metal layer 3 cut by the laser beam 60. This formation of the protrusion 21 prevents the misalignment of the slot 30 with respect to the insulator 2. It can also suppress the metal layer 3 from peeling off starting from the end surface 3*c* of the metal layer 3.

As shown in FIG. 4C, it is desirable for the protrusion 21 to cover the entire end surface 3*c* of the metal layer 3 from the inner peripheral surface 3*a* to the outer peripheral surface 3*b* in at least a part of the peripheral edge of the slot 30, but if the protrusion 21 covers at least a part of the end surface 3*c* of the metal layer 3, the effect of suppressing the misalignment of the slot 30 and the delamination of the metal layer 3 can be obtained.

Effect of the First Embodiment According to the first embodiment, the unevenness formed on the outer peripheral surface 2*b* of the insulator 2 makes it possible to control the misalignment of the slot 30 with respect to the insulator 2, making it easier to direct the electromagnetic waves in the desired direction. In addition, by forming the metal layer 3 on the outer periphery of the insulator 2 while the insulator 2 is formed on the outer periphery of the core material 4, the shape of the insulator 2 in the solution during the metal layer forming step can be properly maintained, and the metal layer 3 can be formed with uniform thickness on the outer peripheral surface 2*b* even if the insulator 2 is thin. In addition, dielectric loss can be reduced by forming a thinner insulator 2.

Modified Example 1 of the Manufacturing Method

In the first embodiment, the case of manufacturing the leaky waveguide 1 by the insulator forming step, the roughening step, the metal layer forming step, the slot forming step, and the cavity forming step is described, but the present invention is not limited thereto. The thermal expansion coefficient of the core material 4 and the insulator 2 may be different, and after the metal layer forming step but before the cavity forming step, a temperature change step may be further provided in which the temperature of the core material 4 and the temperature of the insulator 2 are changed to decrease the adhesive strength between the core material 4 and the insulator 2.

For example, if the thermal expansion coefficient of the insulator 2 is higher than that of the core material 4, heating the core material 4 and the insulator 2 causes the insulator 2 to expand at a higher rate than the core material 4, resulting in reduced adhesion (i.e., adhesive force) between the core material 4 and the insulator 2. If the thermal expansion coefficient of the core material 4 is higher than that of the insulator 2, cooling the core material 4 and the insulator 2 causes the insulator 2 to contract at a higher rate than the core material 4, and the adhesion between the core material 4 and the insulator 2 decreases.

When the core material 4 and the insulator 2 are heated together with the metal layer 3 and then cooled, or when the core material 4, the insulator 2, and the metal layer 3 are cooled from room temperature, the thermal expansion coefficient of resin is generally about 10 times higher than that of metal, so the difference in shrinkage rates between the insulator 2 and the metal layer 3 causes a peeling force between them. However, since the outer peripheral surface 2*b* of the insulator 2 is roughened by the roughening step to enhance adhesion with the metal layer 3, the insulator 2 is prevented from peeling off from the metal layer 3.

The temperature change step before the cavity forming step reduces the adhesion between the core material 4 and the insulator 2, making it easier to remove the core material 4 without causing damage to the insulator 2 or the metal layer 3 in the cavity forming step.

Modified Example 2 of the Manufacturing Method

In the first embodiment, the slot 30 is formed by removing the metal strip 300 by laser processing in the slot forming step. In this modified example, however, the slot 30 is formed by not depositing metal in the metal layer forming step on the portion that will become the slot 30. As mentioned above, when electroless plating is performed, palladium, which is the deposition nucleus, is adsorbed on the outer peripheral surface 2*b* of the insulator 2. In this modified example, electroless plating is performed after removing the palladium adsorbed on the outer peripheral surface 2*b* of the insulator 2, e.g., by laser beam, from the portion that will become the slot 30. As a result, no metal is deposited in the portion from which the palladium is removed, and thus the slot 30 is formed. In other words, in this modified example, the process of removing the palladium adsorbed on the outer peripheral surface 2*b* of the insulator 2 from the portion that will become the slot 30 is the slot forming step.

Modified Examples of the Shape of the Leaky Waveguide

In the first embodiment, the shape of the leaky waveguide 1 in the cross-section perpendicular to the axial direction is circular. However, by changing the shape of the core material used in the insulator (e.g., insulating tube) forming step, e.g., leaky waveguides of various shapes can be formed depending on the application.

Figure 5A:
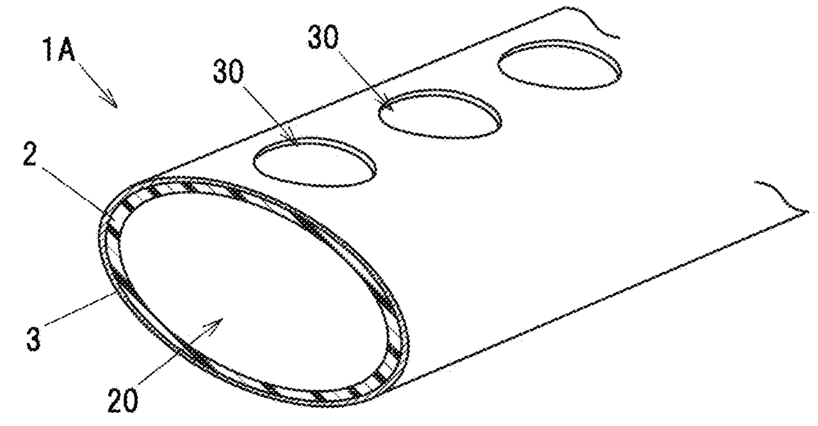
FIGS. 5A to 5C are perspective views showing leaky waveguides in modified examples.
Figure 5B:
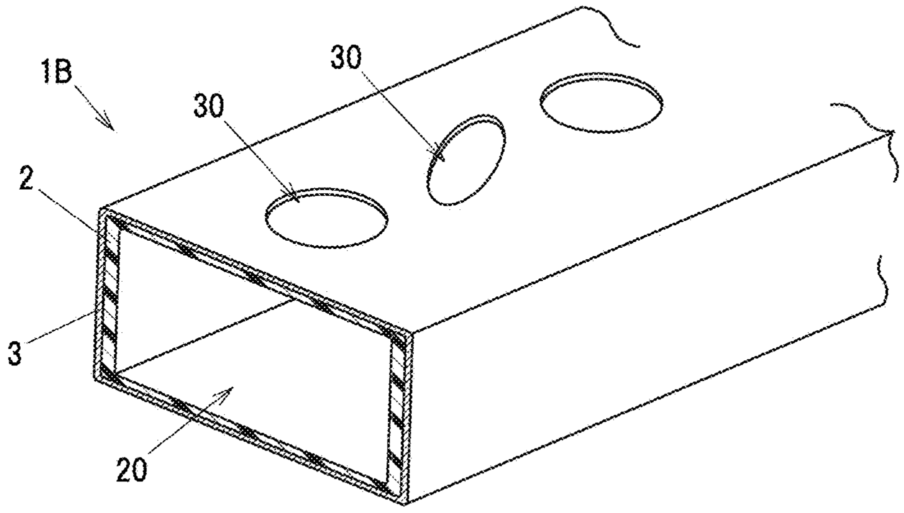
Figure 5C:
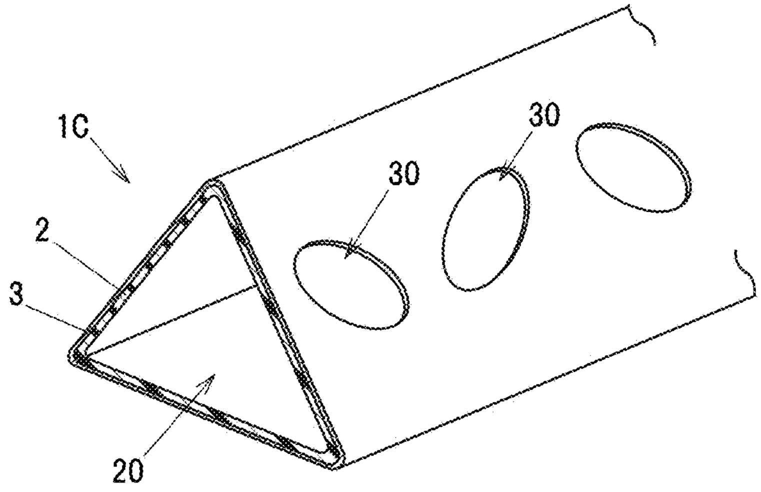

FIGS. 5A to 5C show leaky waveguides 1A to 1C according to the first to third variants, which differ in shape from the first embodiment. Each of the leaky waveguides 1A to 1C includes an insulator 2 and a metal layer 3 as in the first embodiment, and a cavity 20 is formed in the center of the insulator 2, but the shape is different from the leaky waveguide 1 in the first embodiment.

The leaky waveguide 1A in the first variant shown in FIG. 5A has an elliptical shape in a cross-section perpendicular to the axial direction. The leaky waveguide 1B in the second variant shown in FIG. 5B has a rectangular shape in a cross-section perpendicular to the axial direction. The leaky waveguide 1C in the third variant shown in FIG. 5C has a triangular shape in a cross-section perpendicular to the axial direction.

The leaky waveguides 1A to 1C for the first to third variants are manufactured by the same manufacturing method as in the first embodiment or modified examples, but a core material with an elliptical cross-sectional shape is used to manufacture the leaky waveguide 1A in the first variant, a core material with an oval cross-sectional shape is used to manufacture the leaky waveguide 1B in the second variant, and a core material with a triangular cross-sectional shape is used to manufacture the leaky waveguide 1C in the third variant. The shape and size of the cavity 20 correspond to the shape and size of the core material. Thus, according to the manufacturing method of the present invention, it is possible to form leaky waveguides of various shapes depending on the shape of the core material.

Second Embodiment

Figure 6A:
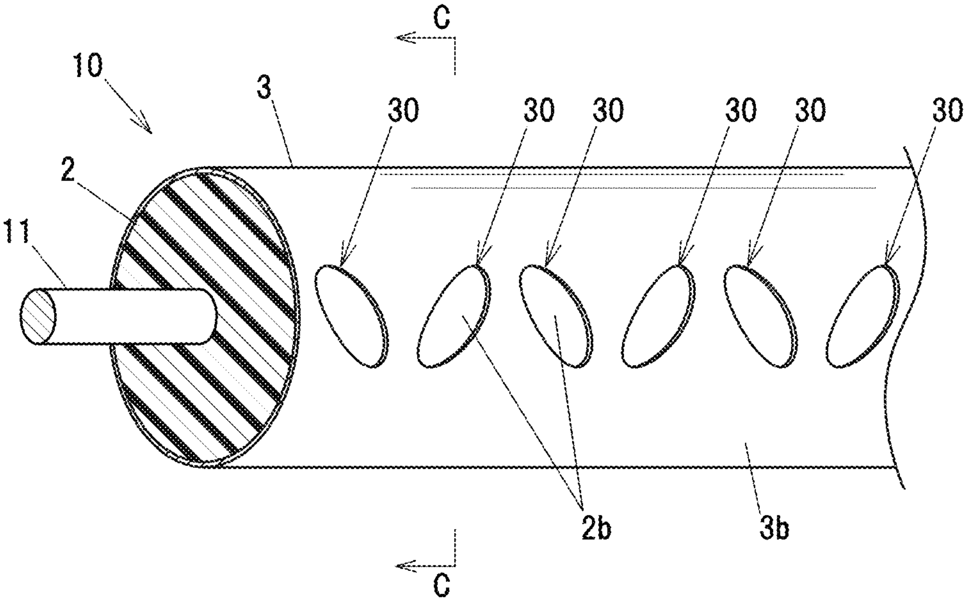
FIG. 6A is a perspective cross-sectional view of a leaky coaxial cable in the second embodiment of the present invention.
Figure 6B:
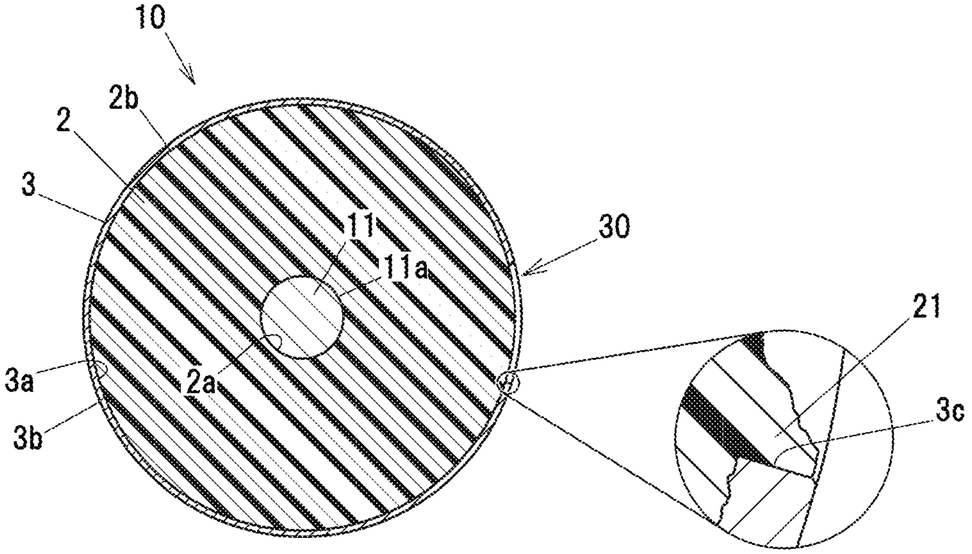
FIG. 6B is a cross-sectional view of the leaky coaxial cable taken along a line C-C in FIG. 6A.

FIG. 6A is a perspective cross-sectional view of a leaky coaxial cable 10 according to the second embodiment of the present invention. FIG. 6B is a cross-sectional view of the leaky coaxial cable 10 taken along a line C-C of FIG. 6A.

Like the leaky waveguide 1, the leaky coaxial cable 10 includes an insulator 2 composed of linear resin, and a metal layer 3 formed on the outer periphery of the insulator 2. A plurality of slots 30 are formed to penetrate through an inner peripheral surface 3*a* and an outer peripheral surface 3*b* of the metal layer 3, but a configuration in which a center conductor 11 is placed in the center of the insulator 2 differs from that of the leaky waveguide 1. The insulator 2 is cylindrical, and an inner peripheral surface 2*a* of the insulator 2 is in close contact with an outer peripheral surface 11*a* of the center conductor 11. The material and thickness of the insulator 2 and the material and thickness of the metal layer 3 are the same as those in the first embodiment. The center conductor 11 is made of, e.g., copper or aluminum. The metal layer 3 serves as the outer conductor.

Similarly to the leaky waveguide 1 in the first embodiment, the leaky coaxial cable 10 has the outer peripheral surface 2*b* of the insulator 2 roughened so that the surface roughness of the outer peripheral surface 2*b* is larger than that of the inner peripheral surface 2*a*, and the peripheral edge of the slot 30 has a protrusion 21. Misalignment of the slot 30 with respect to the insulator 2 is suppressed by the unevenness formed on the outer peripheral surface 2*b* of the insulator 2.

The manufacturing method of the leaky coaxial cable 10 includes an insulator forming step of forming an insulator 2 in a cylindrical shape around an outer periphery of a center conductor 11, a roughening step of roughening an outer peripheral surface 2*b* of the insulator 2, a metal layer forming step of forming a metal layer 3 on the roughened outer peripheral surface 2*b* of the insulator 2, and a slot forming step of forming a plurality of slots 30 through the metal layer 3 between an inner peripheral surface 3*a* and an outer peripheral surface 3*b* of the metal layer 3. The respective steps are similar to the insulator forming step, roughening step, metal layer forming step, and slot forming step in the first embodiment.

Effect of the Second Embodiment

Similarly to the first embodiment, the leaky coaxial cable 10 according to the second embodiment makes it possible to suppress the misalignment of the slot 30 with respect to the insulator 2, thereby making it easier to direct the electromagnetic waves in the desired direction.

SUMMARY OF THE EMBODIMENTS

Next, the technical concepts that can be grasped from the aforementioned embodiments will be described with the aid of the characters, etc. in the embodiments. However, each character in the following description does not limit the components in the scope of the claims to the parts, etc. specifically shown in the embodiments.

According to the first feature, a leaky cable (leaky waveguide 1, 1A to 1C; leaky coaxial cable 10) includes a linear insulator 2, and a metal layer 3 formed on an outer peripheral surface 2*b* of the insulator 2, wherein a slot 30 for leaking electromagnetic waves is formed through the metal layer 3 between an inner peripheral surface 3*a* and an outer peripheral surface 3*b* of the metal layer 3, wherein the outer peripheral surface 2*b* of the insulator 2 is formed with unevenness that inhibits misalignment of the slot 30 with respect to the insulator 2.

According to the second feature, in the leaky cable (leaky waveguide 1, 1A to 1C; leaky coaxial cable 10) as described in the first feature, a portion of the insulator 2 protrudes from the inner peripheral surface 3*a* toward the outer peripheral surface 3*b* of the metal layer 3 at a peripheral edge of the slot 30.

According to the third feature, in the leaky cable (leaky waveguide 1, 1A to 1C; leaky coaxial cable 10) as described in the second feature, the insulator 2 is composed of thermoplastic resin, and a portion of the insulator 2 is a solidified portion of molten resin melted by heat of a laser beam 60 when forming the slot 30 in the metal layer 3.

According to the fourth feature, in the leaky cable (leaky waveguide 1, 1A to 1C; leaky coaxial cable 10) as described in the first feature, the insulator 2 is formed in a cylindrical shape, and a surface roughness of the outer peripheral surface 2*b* of the insulator 2 is larger than a surface roughness of the inner peripheral surface 2*a* of the insulator 2.

According to the fifth feature, in the leaky cable (leaky waveguide 1, 1A to 1C; leaky coaxial cable 10) as described in the fourth feature, an area roughness Sa of the outer peripheral surface 2*b* of the insulator 2 of a portion covered by the metal layer 3 is 0.8 μm or more and 6.0 μm or less.

According to the sixth feature, in the leaky cable (leaky waveguide 1, 1A to 1C) as described in any one of the first to fifth features, the insulator 2 is hollow.

According to the seventh feature, in the leaky cable (leaky coaxial cable 10) as described in any one of the first to fifth features, a center conductor 11 is located in a center of the insulator 2.

According to the eighth feature, a method of manufacturing a leaky cable (leaky waveguide 1, 1A to 1C; leaky coaxial cable 10) includes an insulator forming step of forming an insulator 2 composed of thermoplastic resin in a cylindrical shape, a roughening step of roughening an outer peripheral surface 2*b* of the insulator 2, a metal layer forming step of forming a metal layer 3 on the outer peripheral surface 2*b* of the insulator 2, and a slot forming step of forming a slot 30 through the metal layer 3 between an inner peripheral surface 3*a* and an outer peripheral surface 3*b* of the metal layer 3, the slot 30 being configured to leak electromagnetic waves to outside of the metal layer 3.

According to the ninth feature, in the method of manufacturing a leaky cable (leaky waveguide 1, 1A to 1C; leaky coaxial cable 10), the slot forming step including applying a laser beam 60 to the outer peripheral surface 3*b* of the metal layer 3 to open the slot 30 and melt a portion of the insulator 2, wherein a portion of a resolidified resin portion, in which a molten resin solidifies, protrudes from the inner peripheral surface 3*a* toward the outer peripheral surface 3*b* of the metal layer 3 at a peripheral edge of the slot 30.

According to the tenth feature, in the method of manufacturing a leaky cable (leaky waveguide 1, 1A to 1C; leaky coaxial cable 10), the insulator forming step includes forming the insulator 2 on an outer periphery of a shaft-shaped core material 4, and the method further includes a cavity forming step of removing the core material 4 to form a cavity 20 in a center of the insulator 2, after the metal layer forming step or the slot forming step.

According to the eleventh feature, in the method of manufacturing a leaky cable (leaky waveguide 1, 1A to 1C; leaky coaxial cable 10), the core material 4 is composed of resin, wherein the cavity forming step includes pulling out the core material 4 while stretching the core material 4 in an axial direction.

According to the twelfth feature, in the method of manufacturing a leaky cable (leaky waveguide 1, 1A to 1C; leaky coaxial cable 10), thermal expansion coefficients of the core material 4 and the insulator 2 are different, and the method further includes a temperature change step of changing temperature of the core material 4 and temperature of the insulator 2 to decrease an adhesive force between the core material 4 and the insulator 2, before the cavity forming step.

The above description of the embodiments and modified examples of the invention does not limit the invention as claimed above. It should also be noted that not all of the combinations of features described in the embodiments and modified examples are essential for the invention to solve the problems of the invention.

The present invention can be implemented with appropriate modifications as long as they do not depart from the intent of the invention. For example, in the first and second embodiments, the case of roughening the outer peripheral surface 2*b* of the insulator 2 by dry ice blasting is described, but the outer peripheral surface 2*b* of the insulator 2 may be roughened by other mechanical or chemical methods. In the first and second embodiments, the case where the misalignment of the slot 30 with respect to the insulator 2 is suppressed by the unevenness caused by the roughening step and the unevenness caused by the protrusion 21 formed in the slot forming step is described, but the present invention is not limited thereto. For example, it is also possible to suppress the misalignment of the slot 30 by only the unevenness caused by the roughening step, or by only the unevenness caused by the protrusions 21. In other words, the unevenness to suppress the misalignment of the slot 30 with respect to the insulator 2 is only required to be formed in at least one of the roughening step and the slot forming step.

The invention claimed is:

1. A leaky cable having a structure configured to propagate electromagnetic waves, comprising:

a linear insulator; and a metal layer formed on an outer peripheral surface of the insulator, wherein a slot for leaking the electromagnetic waves is formed through the metal layer between an inner peripheral surface and an outer peripheral surface of the metal layer, wherein the outer peripheral surface of the insulator is formed with unevenness that inhibits misalignment of the slot with respect to the insulator, wherein a portion of the insulator protrudes from the inner peripheral surface toward the outer peripheral surface of the metal layer at a peripheral edge of the slot, wherein the portion of the insulator that protrudes adheres at least a part of the end surface of the metal layer at the peripheral edge of the slot, wherein a ratio of a thickness of the metal layer to a radial thickness of the insulator is between 0.2% and 40%, and wherein the cable is configured to be bent to 90° without cracking or delaminating the metal layer at a bending radius of 2.5 times an outer diameter of the leaky cable.

2. The leaky cable, according to claim 1, wherein the insulator comprises thermoplastic resin, and a portion of the insulator is a solidified portion of molten resin melted by heat of a laser beam when forming the slot in the metal layer.

3. The leaky cable, according to claim 1, wherein the insulator is formed in a cylindrical shape, and a surface roughness of the outer peripheral surface of the insulator is larger than a surface roughness of the inner peripheral surface of the insulator.

4. The leaky cable, according to claim 3, wherein an area roughness of the outer peripheral surface of the insulator of a portion covered by the metal layer is 0.8 μm or more and 6.0 μm or less.

5. The leaky cable, according to claim 1, wherein the insulator is hollow.

6. The leaky cable, according to claim 1, wherein the structure configured to propagate the electromagnetic waves is a center conductor located in a center of the insulator.

7. The leaky cable, according to claim 1, wherein the portion of the insulator that protrudes adheres at least a part of the end surface of the metal layer at the peripheral edge of the slot to inhibit misalignment.

8. The leaky cable, according to claim 1, wherein the metal layer is formed by electroless plating on the outer peripheral surface of the insulator, and wherein the unevenness on the outer peripheral surface of the insulator enhances adhesion strength between the insulator and the metal layer via an anchor effect.

9. The leaky cable, according to claim 1, wherein the portion of the insulator that protrudes covers an entire end surface of the metal layer from the inner peripheral surface to the outer peripheral surface at least a part of the peripheral edge of the slot.

10. The leaky cable, according to claim 5, wherein the insulator is hollow, and an outer diameter of the leaky cable is between 1 mm and 8 mm, and wherein the leaky cable is configured to transmit the electromagnetic waves in a microwave band from 300 MHz to 3 THz.

11. The leaky cable, according to claim 6, wherein the center conductor comprises copper or aluminum, and the metal layer serves as an outer conductor, and wherein the inner peripheral surface of the insulator is in contact with an outer peripheral surface of the center conductor.

12. The leaky cable, according to claim 1, wherein the structure configured to propagate the electromagnetic waves is a hollow cavity formed within the insulator.

13. The leaky cable, according to claim 1, wherein the insulator comprises polyethylene, polypropylene, or fluorinated resin, and wherein the insulator has a low dielectric constant to suppress dielectric loss.

* * * * *